United States Patent [19]

Sano

[11] Patent Number: 4,535,798
[45] Date of Patent: Aug. 20, 1985

[54] ROTATION CONTROL VALVE OF POWER STEERING SYSTEM

[75] Inventor: Osamu Sano, Kashihara, Japan

[73] Assignee: Koyo Auto-Mech. Co., Ltd., Kashihara, Japan

[21] Appl. No.: 420,635

[22] Filed: Sep. 21, 1982

[30] Foreign Application Priority Data

Sep. 22, 1981 [JP] Japan .................................. 56-148807

[51] Int. Cl.³ .............................................. B62D 5/08
[52] U.S. Cl. .............................. 137/625.21; 91/375 A
[58] Field of Search ...................... 137/625.21, 625.22, 137/625.23, 625.24; 91/375 R, 375 A

[56] References Cited

U.S. PATENT DOCUMENTS 4,335,745  6/1982  Bouveret .................... 137/625.22 X
4,387,737  6/1983  Tobiasz ......................... 137/625.21

Primary Examiner—Alan Cohan
Attorney, Agent, or Firm—Fleit, Jacobson, Cohn & Price

[57] ABSTRACT

In a rotation control valve of a power steering system, there are arranged in a valve housing a spool section on an input shaft and a valve body secured to an output shaft. According to the invention, a seal housing is arranged between the valve body and the valve housing, and O-rings are provided between the seal housing and the valve housing and a clearance of about 0.005–0.02 mm exists between the seal housing and the valve body, which results in a floating support of the valve body within the valve housing.

2 Claims, 1 Drawing Figure

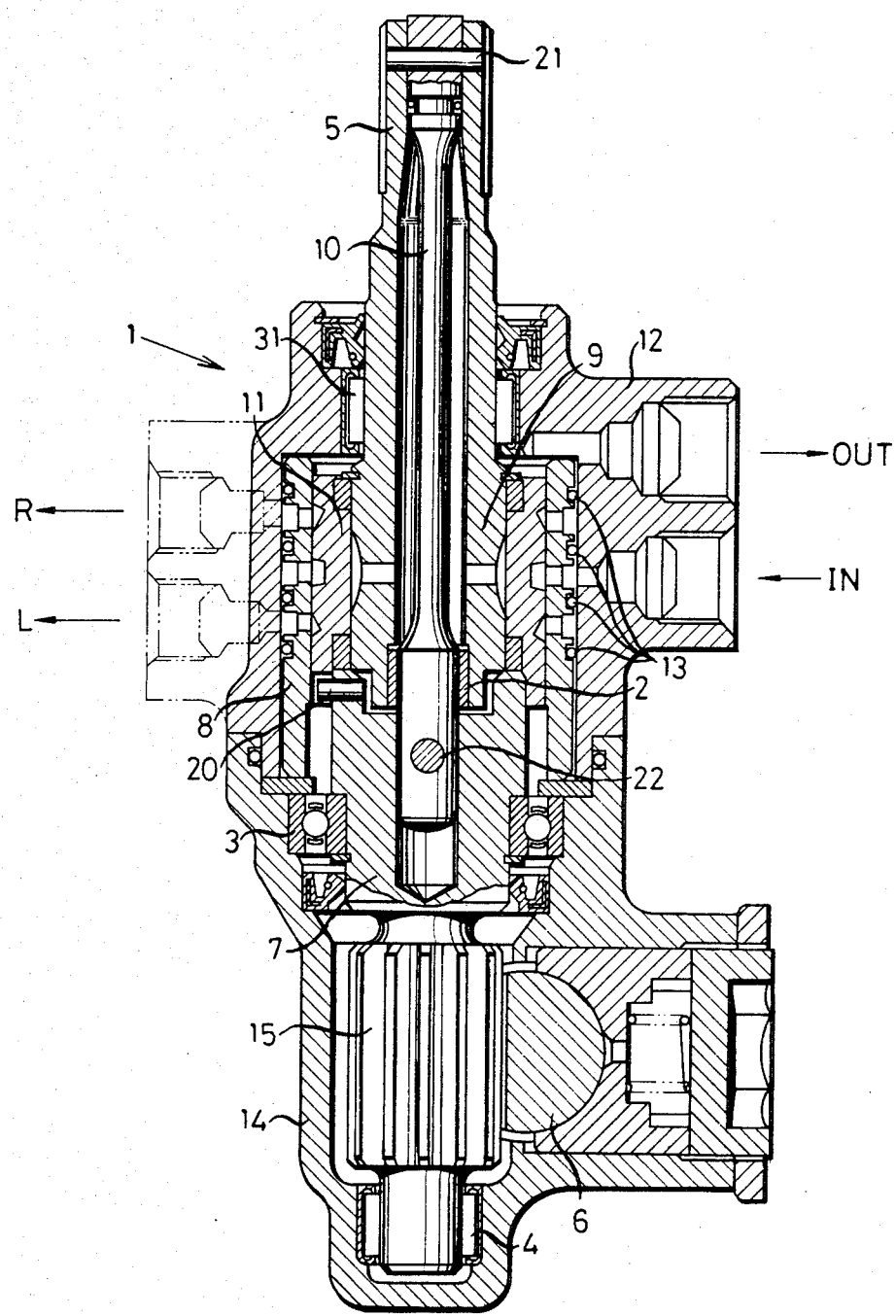

ROTATION CONTROL VALVE OF POWER STEERING SYSTEM

BACKGROUND OF THE INVENTION

This invention relates to a rotation control valve of a power steering system comprising a spool section on an input shaft, and a valve body loosely fitted over the spool section and secured to an output shaft connected to the input shaft through a torsion bar to be operative to control supply and discharge of pressure fluid to and from a hydraulic cylinder acting on the output shaft in accordance with a relative angular displacement between the spool section and the valve body commensurate with a load applied to the output shaft.

In this type of rotation control valve of the prior art, it has hitherto been usual practice to mount the valve body in a valve housing and to fit a resilient O-ring formed as of rubber in an annular outer groove formed on an outer side surface of the valve body, to ensure that a hermetic seal is provided between supply and discharge ports for the pressure fluid formed in the valve casing and between the pressure fluid supply and discharge ports and the valve body and valve housing. In the rotation control valve of this construction, the resilient O-ring rotates with the valve body because the latter rotates in conjunction with the output shaft, so that the resistance offered to the rotation of the valve body increases. Also, an increase in the pressure of the pressure fluid increases the resistance offered by the O-ring itself. Thus difficulties have been experienced in letting the relative positions of the valve body and the spool section correspond to the load applied to the output shaft. This defect is important because it spoils the feel of a driver who operates a steering wheel by utilizing the power steering system.

SUMMARY OF THE INVENTION

This invention has as its object the provision of a rotation control valve of a power steering system which obviates the afore-said defect of the prior art.

The aforesaid object of the invention is accomplished by providing a seal housing loosely fitted over the valve body and floatingly supported within the valve housing through the resilient O-ring formed as of rubber.

This structural feature frees the valve body from the sliding resistance of the resilient O-ring, so that the rotational resistance between the seal housing and the valve body can be reduced and the valve body can be positively positioned in a manner to be commensurate with the load applied to the output shaft. Another advantage offered by the structural feature is that even if there is slight eccentricity in the output shaft system or the input shaft system, the seal housing can move relatively freely within the valve housing in a radial direction because it is floatingly supported through the resilient O-ring, so that any failure of the rotation control valve due to premature wear which might otherwise be caused by the eccentricity can be prevented. Also, as aforesaid, no precise finishes are required, so that production of the power steering system or the rotation control valve is facilitated. Additionally, the resilient O-ring formed as of rubber does not move in rotational or sliding movement and this is a factor concerned in enabling the O-ring to perform a hermetic sealing function over a prolonged period of time.

Additional and other objects, features and advantages of the invention will become apparent from the description set forth hereinafter when considered in conjunction with the accompanying drawing.

BRIEF DESCRIPTION OF THE DRAWING

The single drawing is a vertical sectional view of a power steering system eqipped with the rotation control valve comprising one embodiment of the invention.

DETAILED DESCRIPTION OF THE PREFERRED EMBODIMENT

A preferred embodiment of the invention will now be described by referring to the accompanying drawings. The rotation control valve according to the invention generally designated by the reference numeral 1 comprises a spool section 9 on an input shaft 5, and a valve body 11 loosely fitted over the spool section 9 and linked through a pin 20 to a pinion shaft 7 serving as an output shaft connected to the input shaft 5 through a torsion bar 10.

A cylindrical seal housing 8 is floatingly supported within a valve housing 12 coaxially thereof through a resilient O-ring 13 formed as of rubber The valve body 11 which is also cylindrical in form is fitted in a cavity in the cylindrical seal housing 8 with an allowable clearance of about 0.005–0.02 mm existing therebetween, and the valve body 11 is connected to the pinion shaft 7 or the output shaft through the pin 20 so that the valve body 11 and the pinion shaft 7 will rotate as a unit.

The pinion shaft 7 is rotatably journalled by bearings 3 and 4 in a gear case 14 and formed thereon with a pinion 15 meshing with a rack 6 which is connected to wheels through a tie rod, etc., not shown.

The input shaft 5 which extends through the valve housing 12 into a cavity in the valve body 11 is journalled by a bearing 2 for rotation relative to the pinion shaft 7 and, therefore, to the valve body 11 and by a bearing 31 for rotation relative to the valve housing 12 and, therefore, to the seal housing 8. The input shaft 5 directly connected to a steering wheel, not shown, is connected through pins 21, 22 and the torsion bar 10 to the pinion shaft 7 connected to wheels, not shown. When for example the steering wheel is in a neutral position and there is no relative displacement between the input shaft 5 and the pinion shaft 7, the pressure fluid from a pump, not shown, flows in a direction indicated by IN and immediately flows out in a direction indicted by OUT in circulation with acting the same oil pressure on right and left pressure chambers of a power cylinder section. However, when there is a relative displacement between the input shaft 5 and the pinion shaft 7, the rotation control valve 1 is actuated to cause the pressure fluid from the pump to flow through the valve body 11 to the seal housing 8 from which the pressure fluid is selectively fed to a left pressure chamber or a right pressure chamber of the power cylinder section through a port L or R formed in the valve housing 12.

The structural relationship described hereinabove prevents rotational resistance from being produced between the valve body 11 and the seal housing 8 which might otherwise be produced as described by referring to the prior art, and the driver does not feel rotational resistance due to additional sealing.

Needless to say, rotational resistance offered by the input shaft is reduced as compared with that in the prior art and consequently return of the steering wheel to the neutral position is facilitated. The seal housing is sealed by means of a resilient O-ring formed as of rubber.

However, the invention is not limited to this specific type of seal and an O-ring formed of polytetrafluoroethylene or a combination of a resilient O-ring formed of rubber with a polytetrafluoroethylene ring may be used instead.

While the invention has been shown and described hereinabove as being incorporated in a rack-and-pinion type power steering system comprising rotation control valve, it is to be understood that the invention can have application in a ballscrew type power steering system.

What is claimed is:

1. A rotation control valve for a power steering system, said rotation control valve comprising:
   an input shaft;
   a spool section of the input shaft;
   an output shaft;
   a valve housing;
   a chamber defined by the valve housing;
   a valve body mounted within the chamber of the valve housing, said valve body surrounding the spool section and being secured to the output shaft;
   a torsion bar interconnecting the input shaft and the output shaft for controlling supply and discharge of pressure fluid to and from a hydraulic pressure cylinder acting on said output shaft in accordance with angular displacement of the spool section and the valve body commensurate with a load applied to the output shaft;
   a seal housing floatingly mounted within the chamber of the valve housing between said valve housing and said valve body, said seal housing surrounding the valve body, the valve body being rotatably mounted within the seal housing and a clearance in the range of 0.005 to 0.02 mm exists between the seal housing and the valve body; and
   O-rings supporting the seal housing within the chamber of the valve housing, said seal housing thereby being movable in a radial direction within the valve housing.

2. A rotation control valve is claimed in claim 1, wherein the O-rings are made of rubber.

* * * * *